United States Patent [19]

Gerding

[11] Patent Number: 4,562,614
[45] Date of Patent: Jan. 7, 1986

[54] CIRCULAR SAW FOR SPLITTING ANIMAL CARCASS

[75] Inventor: William Gerding, Beenleigh, Australia

[73] Assignee: Teys Bros. Pty. Ltd., Queensland, Australia

[21] Appl. No.: 491,335

[22] PCT Filed: Aug. 26, 1982

[86] PCT No.: PCT/AU82/00139
§ 371 Date: Apr. 25, 1983
§ 102(e) Date: Apr. 25, 1983

[87] PCT Pub. No.: WO83/00603
PCT Pub. Date: Mar. 3, 1983

[30] Foreign Application Priority Data
Aug. 26, 1981 [AU] Australia ................. PF0442

[51] Int. Cl.⁴ .............................................. A22B 5/20
[52] U.S. Cl. .......................................... 17/23; 83/734
[58] Field of Search ........................... 17/23; 83/734

[56] References Cited

U.S. PATENT DOCUMENTS 4,146,945  4/1979  Hotard .................................. 17/23
4,337,550  7/1982  Baylor et al. ........................ 17/23

FOREIGN PATENT DOCUMENTS 218079   5/1958  Australia ............................. 17/23
943094   5/1956  Fed. Rep. of Germany .
2055548  8/1979  United Kingdom .

Primary Examiner—Willie G. Abercrombie
Attorney, Agent, or Firm—Jackson & Jones

[57] ABSTRACT

An automated and manually-operative carcass-splitting apparatus is disclosed. Enhanced alignment of a centerline of a carcass with a circular blade of a saw assembly is provided. The carcass is suspended by hooks on a continuously moving conveyor system. Indexing permits selective engagement between a station's frame and the moving conveyor. The station simultaneously moves horizontally while it descends in concert with the horizontal movement of the carcass. A hydraulically-driven suspension mechanism pivotably suspends a fluid-powered saw with freedom for several directions of manually-controlled movements during carcass cutting.

8 Claims, 5 Drawing Figures

CIRCULAR SAW FOR SPLITTING ANIMAL CARCASS

BACKGROUND OF THE INVENTION

1. Field of the Invention

This invention relates to an improved automated carcass splitting apparatus for use in animal slaughterhouses abattoirs and the like.

2. Background Discussion

Previously known devices for handling and splitting animal carcasses have comprised a wide variety of automated or semi-automated systems which are generally suitable for handling one specific type of beast or beasts of similar dimensions and characteristics i.e. beef and horse carcasses or pig and sheep carcasses. Amongst the splitting saws hitherto available have been electrically operated circular saws, electric or hydraulic reciprocating saws, band saws or pneumatic percussion cutters. Generally speaking, electric circular saws are preferred for splitting beef carcasses while a pig carcass splitter may often comprise pneumatically driven dual chopping blades driven down either side of the backbone. A reciprocating saw fitted with chopping blades has found limited acceptance as a splitter suitable for a wider range of animal carcasses.

In general the electric circular saw has been found to be the most suitable carcass splitting saw in view of its speed (about 10 seconds for any beast compared with variable times up to 20 seconds for a reciprocating saw depending on the size of the carcasses. Electric circular saws are generally simple in construction and thus have low maintenance requirements and at the same time permit easy and economical blade sharpening. Further there are traditional labour savings in use of a circular saw due to its speed of operation and ease of use which are reflected in labour piece rates applicable to slaughter floor operations. The use of a circular saw necessitates less spreading of the carcass in view of its relatively thin blade compared with those of reciprocating or band saws. Of the prior art saws, only the circular saw has been found particularly suitable for automated systems wherein the saw station is able to traverse with a carcass on a moving conveyor to split the carcass at a set speed.

Although to date electric circular saws have been considered most suitable for automated systems, they suffer a number of serious disadvantages. Electric circular saws of this type generally comprise a pair of 7.5 or 10 horsepower electric motors mounted on either side of the saw blade on a common shaft. Such saws generally weigh in the region of a half tonne which necessitates very complex suspension systems to permit free movement of the saw. The saws are cumbersome to use because of their weight and bulk in addition to the suspension system. The large rotational mass of the saw gives rise to gyroscopic effects which severely limit free movement and the starting and stopping torque applied to the electric motors can cause "kick-back" which is not only difficult to control and dangerous for the saw operator but also causes undue strain on the suspension system. For safety reasons and the sake of efficiency, it is required to be able to stop the rotation of the saw blade immediately after the carcass splitting operation is completed. This is usually achieved by the provision of a plugging contactor which reduces or even reverses the polarity of the motors momentarily. This places enormous strain on the electrical and mechanical components of the saw motors. Other problems associated with electric circular saws are:

1. Limited depth of cut available due to bulk of motors— this can necessitate use of large blade diameters for large beasts.

2. Very high noise pollution particularly during starting and stopping operation. Under certain cutting conditions, harmonic frequencies of the blade itself can contribute greatly to noise pollution.

3. Lack of speed control to avoid harmonic frequencies in the saw blade. Speed control is also important during washdown and sterilization of the blade. At high speeds wash liquid spray and waste material throw-off can cause a health hazard due to contamination.

4. Sterilization has been considered a problem with this type of saw due to the need to completely contain the saw blade during washdown between carcasses. Complete containment is necessary due to lack of speed control and need to protect motors from ingress of washing liquid.

5. Due to the problems of the weight and bulk of electric circular saws and their suspension systems together with the operational difficulties of "kick-back" and the gyroscopic effects, it has become common practice to mount the saw on a rigid suspension system. The saw is able to travel vertically on the rigid suspension system but it is necessary to carefully align the carcass with the saw blade to permit accurate splitting. This is usually achieved by indexing the carcass to a point adjacent the saw then either stopping the conveyor system or disconnecting the carcass suspension hook from the conveyor, then spreading the hind legs to facilitate easy splitting. After splitting, the carcass sides are then indexed back into the conveyor system by a suitable mechanism.

SUMMARY OF THE INVENTION

It is an aim of the present invention to provide a carcass splitting apparatus which overcomes or substantially alleviates the abovementioned disadvantages.

According to one aspect of the invention there is provided an animal carcass splitting saw means comprising:

- an hydraulic or pneumatically operated circular saw;
- control means to selectively control the speed of rotation of said saw; and,
- suspension means to permit in use substantially free movement of said saw for alignment with a carcass.

Preferably said suspension means comprises a frame attached to said saw, said frame adapted for pivotal connection to a support frame.

Preferably said suspension means includes selectively controllable elevating means whereby in use said saw may be selectively elevated relative to a datum.

Preferably said selectively controllable raising and lowering means comprises an hydraulic or pneumatic cylinder.

According to another aspect of the invention there is provided an animal carcass splitting apparatus comprising:

- an operating station selectively elevatable on a substantially upright axis;
- a saw means substantially as hereinbefore described, said saw means adapted for suspension from said operating station; and, means to selectively move said operating station along an axis which is substantially transverse to the initial upright axis.

Preferably said operating station comprises a first frame means associated with a second frame means and is adapted for elevation on a substantially upright axis therewith.

Preferably said means to move said operating station along a substantially transverse axis comprises means to move said second frame means along a substantially transverse axis.

Preferably said second frame means is adapted for movement along a substantially transverse axis adjacent to and substantially parallel to a conveyor means, and second frame means including means to permit operative association with said conveyor means whereby in use, said second frame means is permitted at least limited travel in association with said conveyor means.

BRIEF DESCRIPTION OF THE DRAWINGS

A preferred embodiment of each aspect of the invention will now be described with reference to the accompanying drawings in which.

DESCRIPTION OF THE PREFERRED EMBODIMENT

Figure 1:
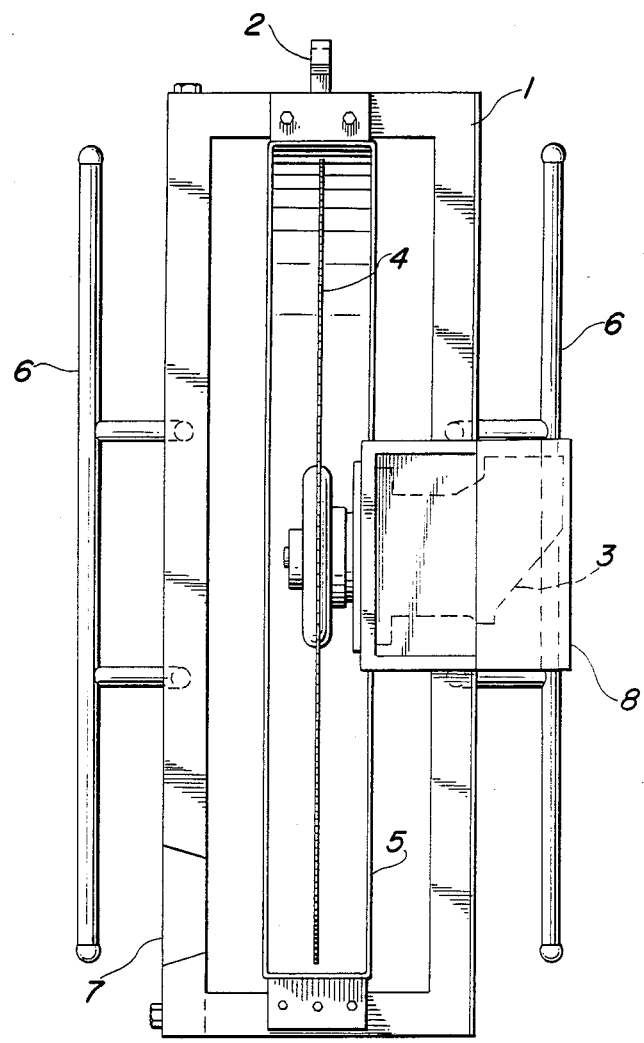
FIG. 1 illustrates a front elevation of a carcass splitting saw means.

In FIG. 1 the saw comprises a frame 1 constructed of hollow square-section steel tubing with a support bracket 2 mounted atop thereof. An hydraulic motor 3 is attached to one side of the frame by any suitable means and is arranged such that the circular saw blade 4 is disposed substantially centrally of the frame 1. A safety guard 5 is mounted on the rear of the frame to protect an operator when the saw is in use. The guard is suitably of channel section and is disposed over approximately one half of the perimeter of the saw blade. Operating handles 6 are suitably mounted on either side of the frame to facilitate use of the saw. To counterbalance the weight of the hydraulic motor mounted to one side of the frame, a counterbalancing weight is required on the other side of the frame. This may be suitably achieved by placement of scrap lead or lead shot 7 within the hollow interior of the other side of frame 1. Alternatively a counterweight may be attached to the exterior of the frame. Counterbalancing of the saw motor permits the saw blade to be oriented essentially vertically when the saw arrangement is suspended from bracket 2.

A guard 8 is preferably mounted over the front and upper part of motor 3 to facilitate cleaning and to prevent, in the event of leaking hydraulic joints, contamination of a carcass during the splitting operation.

Figure 2:
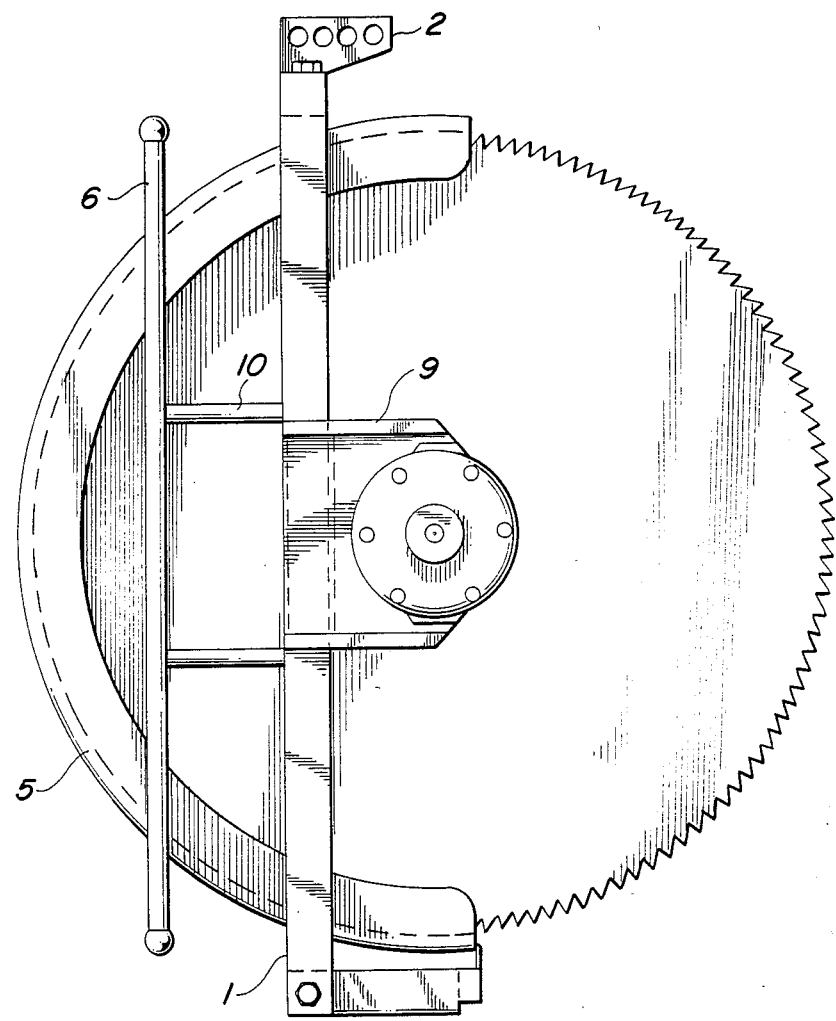
FIG. 2 is a side elevation of the saw illustrated in FIG. 1.

FIG. 2 is a side elevation of the arrangement shown in FIG. 1 from which it can be seen that the saw motor is mounted on suitable brackets 9 forwardly on the frame 1. The operating handles 6 are also mounted rearwardly of frame 2 on suitable brackets 10. The rearwardly disposed handles permit ease of operation of the saw by an operator and the forward disposition of the motor permits greater access to the carcass to ensure maximum depth of cut of the blade. Suspension bracket 2 is provided with a number of apertures 11 to facilitate suspension of the saw.

Figure 3:
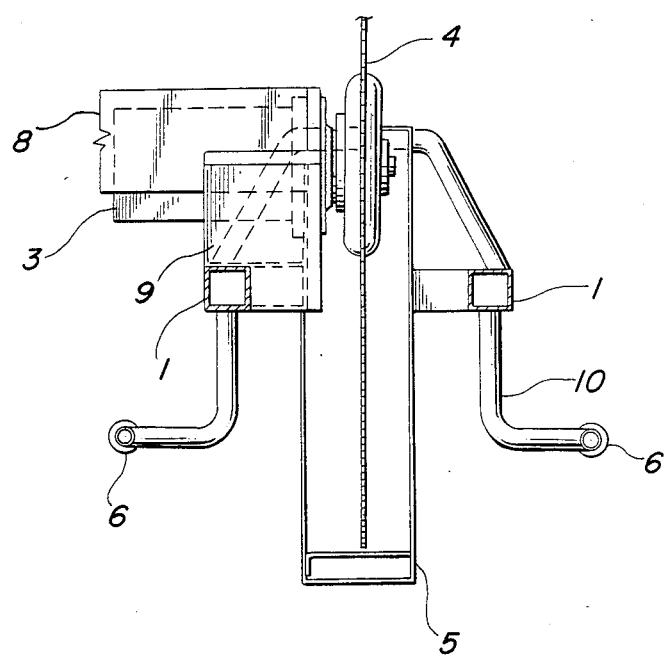
FIG. 3 is a top plan view of the saw of FIGS. 1 and 2.

FIG. 3 is a top plan view of the saw illustrated in FIGS. 1 and 2.

Figure 4:
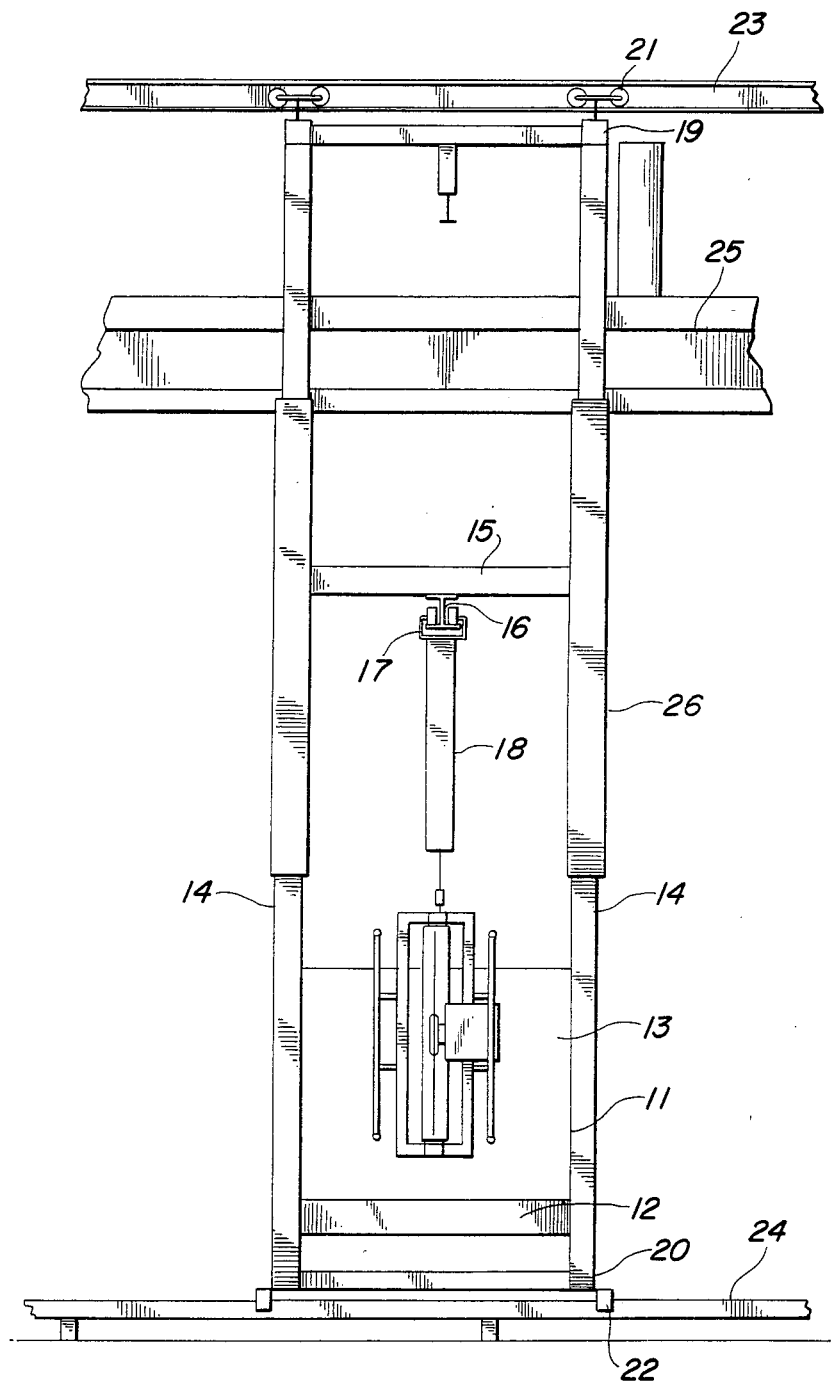
FIG. 4 is a front elevation of a carcass splitting apparatus according to the invention.

FIG. 4 illustrates a front elevation of a carcass splitting apparatus according to the invention. A first frame 11 comprising a platform 12 and a three sided enclosure 13 is attached to a second frame 14 for essentially vertical movement within guides (not shown) on frame 14. Vertical movement of frame 11 is achieved by hydraulic cylinders (not shown) mounted on the rear face of the second frame and attached to frame 11. Frame 11 further includes an upper cross beam 15 mounted on uprights (not shown) located within the guides on frame 14. Mounted underneath cross beam 15 is a rail 16 at substantially right angles thereto. Rail 16 supports a moveable carriage 17 slung from which is an hydraulic cylinder 18 which suspends the saw arrangement as hereinbefore described. Frame 14 is mounted at its upper and lower ends 19 and 20 respectively on rollers 21 and 22 respectively which coact with rails 23 and 24 respectively. Rails 23 and 24 are arranged in parallel relationship with a carcass conveyor system 25 spaced from frame 14.

Figure 5:
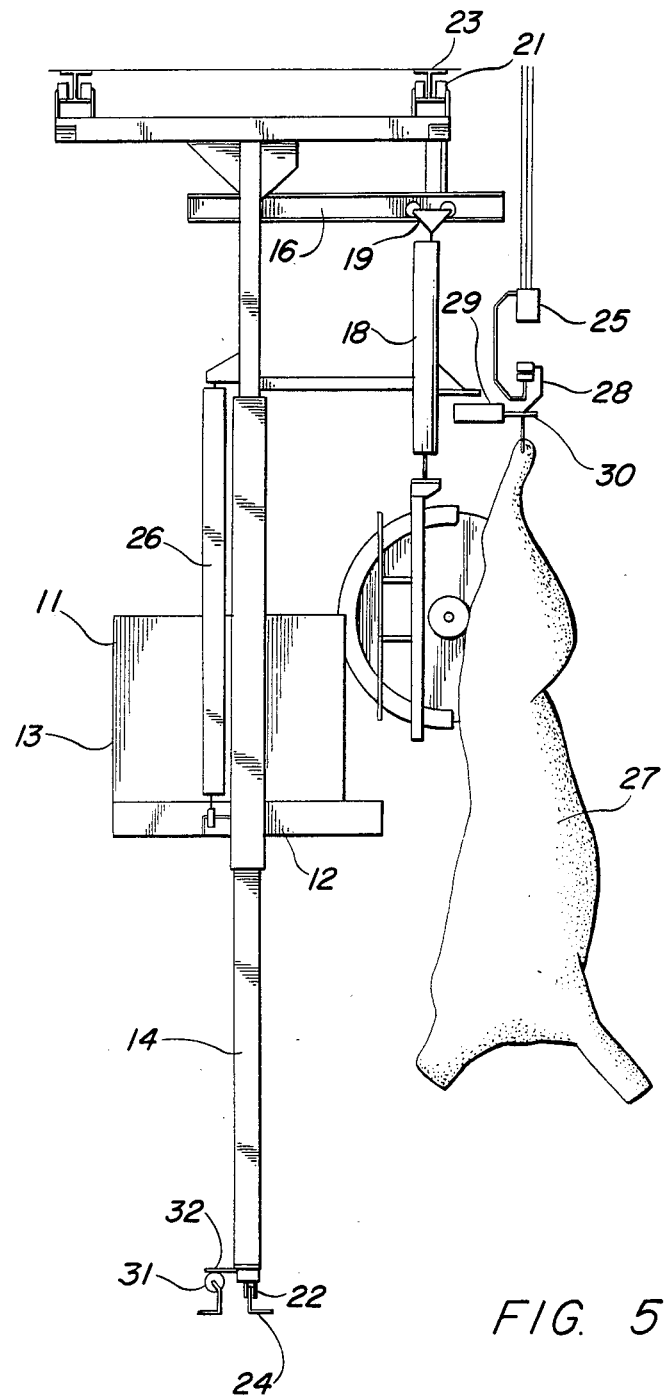
FIG. 5 is a side elevation of the apparatus shown in FIG. 3.

FIG. 5 illustrates a side elevation of the apparatus illustrated in FIG. 4 with frame 11 elevated to its uppermost position by hydraulic cylinders 26. With the frame 11 in the elevated position, an operator standing on platform 12 can commence splitting of the carcass 27 suspended by a suitable hook arrangement 28 from conveyor system 25.

Mounted on a subframe 29 or other suitable attachment means is an indexing means 30 which permits selective engagement between frame 14 and conveyor hook 28 or other moveable conveyor component. The indexing means preferably comprises a pneumatically actuated finger. The indexing means 30 on engagement with say a conveyor hook 28 moving along conveyor system 25 permits alignment of a carcass substantially with the centreline of the blade of the saw assembly while simultaneously drawing frame 14 along its upper and lower tracks 23 and 24. This cooperative movement permits a saw operator to split the carcass while frame 14 moves in concert with the carcass on the conveyor. On completion of the carcass splitting operation, frame 14 is returned to its initial starting position by a pneumatic cylinder 31 mounted adjacent the floor and connected to the frame 14 by a bracket 32 or other suitable means.

In a preferred embodiment of the invention the pneumatic and hydraulic controls for the saw motor 3, the elevating cylinder 18, the indexing means 30 are arranged on frame 11 adjacent the saw either on the saw frame or handles 6 or on a panel attached to the frame 11. These controls permit selective manual operation of each of the above functions.

The pneumatic controls for disengaging the indexing means from the conveyor and for returning frame 14 to its initial postion are preferably automatically controlled by suitable pneumatic or solenoid switching valves but manual override controls are also provided on frame 11. As a further safety feature, pressure sensitive electric switching means may be provided to prevent overrun of frame 11 or frame 14 in either direction or to stop the conveyor in the event of an emergency situation.

Further additional features which may be incorporated in the preferred embodiment are brake means for the saw blade such as a hydraulically or pneumatically operated disc brakes. The controls for the brake means may be manually or automatically operable when hydraulic power is removed from the saw. Saw washing means may also be included within enclosure 13 for washing and disinfecting the saw and blade between each splitting operation. The washing means may be positioned on an interior wall of enclosure 13 or associated for example in the form of jets, with the saw frame. Preferably a sliding or pneumatically retractable door is provided to close the aperture in the three sided enclosure 13 to prevent splashing of washing solution or waste material during the saw washing operation.

The operation of the apparatus according to the invention will now be described. From an initial starting position with a freshly washed saw arrangement, the operator manually activates hydraulic cylinders 26 to elevate frame 11 (hereinafter called the work station) to its maximum height above floor level whereupon the elevating action of cylinders 26 is deactivated automatically. The operator then activates the indexing means 30 to cooperate with the conveyor when a carcass is indexed substantially centrally of the work station. Simultaneously, the operator actuates the saw mechanism and advances the saw via carriage 17 towards the uppermost end of the carcass. When the saw is suitably aligned with the carcass the operator activates the hydraulic circuit connected to cylinders 26 to cause the work station to advance downwardly, the saw splitting the carcass during the downward motion. If due to the size of the carcass, the normal travel of the work station is insufficient to permit complete splitting of the carcass, the operator can then activate saw suspension cylinder 18 to obtain a limited amount of further travel. On completion of the splitting operation, the operator withdraws the saw from the carcass and activates the blade brake. Simultaneously the operator can operate pneumatic cylinder 31 and disengage the indexing means 30 by an override switch to return frame 14 to its original position. Alternatively the operator can wait until the frame 14 reaches the limit stop switches whereupon the indexing means 30 is disengaged from the conveyor and the frame 14 is returned to its initial position by pneumatic cylinders 31. During the return travel of frame 14 to its initial position, the work station is lowered to its initial position at which washing of the saw assembly can be achieved.

The saw assembly of the present invention offers particular advantages in its ease of cleaning which is facilitated by controllable slow rotation of the saw blade.

The controllable speed of rotation of the blade permits an operator to avoid excessive noise from the saw blade when harmonic frequencies are reached, simply by altering the speed of rotation of the saw blade to a greater or lesser degree. In an alternative embodiment, the hydraulic drive means can be coupled to a known speed controller whereby motor torque is automatically adjusted for varying loads to maintain a constant speed of rotation. By this means, one or more predetermined rotational velocities can be chosen to take into account factors which contribute to generation of excessive noise levels.

It will be readily apparent to a skilled addressee that many modifications or variations may be made to the invention without departing from the spirit and scope thereof.

I claim:

1. An animal carcass-splitting apparatus suitable for use with a continuously moving carcass conveyor, said apparatus comprising:
   a support frame movable along guide means parallel to the direction of movement of a continuously moving carcass conveyor;
   an operating station movably mounted on said support frame for selective elevation on an upright axis to an initially elevated position;
   means for selectively elevating said operating station and said circular saw on an upright axis;
   indexing means for selective engagement between said support frame and a movable conveyor component to enable automatic in-use movement and controlled descent of said support frame in concert with a carcass suspended from said conveyor;
   a fluid-powered circular saw suspended from said operating station for selective elevation therewith relative to said support frame; and
   said circular saw suspension means characterized as manually movable through several directions of movement for operator-controlled alignment with the center line of the moving carcass to be split.

2. An apparatus as claimed in claim 1 wherein said indexing means additionally comprises:
   an extensible member mounted on said support frame for selective engagement or disengagement with a moving carcass suspension member on said conveyor whereby in use said support frame is drawn along said guide means by the operation of said conveyor.

3. An apparatus as claimed in claim 2 and further comprising:
   a limit switch means mounted on said guide means to limit the extent of travel therealong of said support frame, said limit switch means, when actuated, operative for retracting said indexing means from said moving carcass suspension member and further operative for actuating a fluid-powered ram assembly tfo return said support frame to an initial position on said guide means.

4. An apparatus for splitting of beef carcasses suspended from a continuously moving conveyor, said apparatus comprising:
   a first support frame movable on upper and lower guide rails parallel to said continuously moving conveyor;
   an operating station mounted for vertical elevation on said support frame;
   a fluid-powered circular saw mounted on said operating station for vertical movement therewith;
   an extensible indexing member mounted on said support frame for selective engagement with a carcass suspension means moving on said conveyor whereby said support frame is urged along the guide rails by the movement of the conveyor;
   a limit switch mounted on said guide rails to limit the extent of travel of said support frame by disengaging said indexing member from said moving carcass suspension means, said limit switch also actuating a fluid-powered ram to return said support frame to an initial position on said guide rails; and operator control means mounted on said operating station for actuating automatic elevation of said operating station to a predetermined height, actuating said indexing member when said operating station is at said predetermined height, actuating said circular saw and also actuating said operating station for automatic descent at a predetermined rate.

5. An apparatus as claimed in claim 4 and further including
operator override controls to override said predetermined limit of travel as indicated by said limit switch.

6. An apparatus as claimed in claim 4 wherein said circular saw further comprises:
speed control means for selectively varying the speed of rotation of a saw blade of said saw to reduce operational noise levels created by harmonic frequencies in the saw blade.

7. An apparatus as claimed in claim 6 wherein said circular saw is operable at very low speeds to facilitate washing of said circular saw blade between each carcass-splitting operation in an open environment without the need for an antisplash enclosure.

8. An apparatus for splitting of beef carcasses suspended from a continuously moving conveyor, said apparatus comprising:
a continuously moving conveyor for moving carcasses to be split;
a first support frame movable on upper and lower guide rails parallel to said conveyor;
an operating station mounted for vertical elevation on said support frame;
a fluid-powered circular saw suspendably mounted on said operating station for vertical movement therewith;
an indexing means mounted on said support frame for selective engagement with a carcass suspension means moving on said conveyor whereby said support frame is urged along the guide rails by the movement of the conveyor;
operator control means mounted on said operating station for actuating the elevation of said operating station to a predetermined height, actuating said indexing member when said operating station is at said predetermined height, actuating said circular saw and also actuating said operating station for automatic descent at a predetermined rate; and
hydraulically-driven suspension means pivotably mounting said fluid-powered circular saw from the upper portion of said operating station and responsive to manual control for multiple direction of movement, including laterally into and out of said carcass during splitting, downwardly an additional vertical amount relative to said station and from left to right for following curves and twists in the spine of said carcass.

* * * * *